United States Patent
Nigam

(10) Patent No.: US 9,351,107 B2
(45) Date of Patent: May 24, 2016

(54) LOCATION RELEVANT DATA COMMUNICATION

(71) Applicant: Rovio Entertainment Ltd, Espoo (FI)

(72) Inventor: Ankit Nigam, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 186 days.

(21) Appl. No.: 14/161,722

(22) Filed: Jan. 23, 2014

(65) Prior Publication Data

US 2015/0208196 A1    Jul. 23, 2015

(51) Int. Cl.
| | | |
|---|---|---|
| *H04W 4/02* | (2009.01) | |
| *A63F 13/847* | (2014.01) | |
| *A63F 13/65* | (2014.01) | |
| *A63F 13/67* | (2014.01) | |

(52) U.S. Cl.
CPC ............... *H04W 4/02* (2013.01); *A63F 13/65* (2014.09); *A63F 13/847* (2014.09); *A63F 13/67* (2014.09)

(58) Field of Classification Search
CPC ....... H04W 4/02; H04W 4/021; H04W 4/028; H04W 4/025; H04W 4/04; H04W 64/00; H04W 4/023; H04W 4/01; H04W 4/043; H04W 4/22; H04W 64/003; H04W 4/206; A63F 13/77; A63F 13/335; A63F 13/73; A63F 13/75; A63F 13/79; A63F 13/10; A63F 13/12; A63F 13/28; A63F 13/30; A63F 13/40; A63F 13/44; A63F 13/50; A63F 13/55; A63F 13/80; A63F 13/847; H04L 67/18; H04M 1/72572
See application file for complete search history.

(56) References Cited

U.S. PATENT DOCUMENTS

| | | | | |
|---|---|---|---|---|
| 2009/0088871 | A1* | 4/2009 | Moor | G06Q 10/06 700/30 |
| 2010/0160038 | A1* | 6/2010 | Youm | A63F 13/10 463/29 |
| 2011/0319148 | A1  | 12/2011 | Kinnebrew et al. | |
| 2012/0122552 | A1* | 5/2012 | Youm | A63F 13/10 463/23 |

(Continued)

FOREIGN PATENT DOCUMENTS

| | | |
|---|---|---|
| EP | 0988876 A1 | 3/2000 |
| EP | 2669809 A1 | 12/2013 |
| WO | WO 2013006645 A1 | 1/2013 |

OTHER PUBLICATIONS

"App for leaving your virtual mark at physical places." NDTV Gadgets. Thomson Reuters. Mar. 19, 2012. Web. Feb. 11, 2014.

(Continued)

*Primary Examiner* — Magdi Elhag
(74) *Attorney, Agent, or Firm* — Squire Patton Boggs (US) LLP

(57) ABSTRACT

In accordance with an example embodiment of the present invention, there is provided an apparatus comprising a memory configured to store information specific to a current location of the apparatus, the information comprising at least one indication of at least one prior processing performed on the information by a second apparatus distinct from the apparatus, at least one processing core configured to perform at least one processing action on the information, determine, whether the at least one processing action is superior to the at least one prior processing in accordance with a metric, and cause the information to be at least in part transmitted from the apparatus, wherein at least one of the occurrence of the transmission and the content of the transmission is at least in part dependent on a result of the determination.

24 Claims, 5 Drawing Sheets

(56) References Cited

U.S. PATENT DOCUMENTS

| | | |
|---|---|---|
| 2012/0315992 A1 | 12/2012 | Gerson et al. |
| 2012/0323347 A1 | 12/2012 | Yariv et al. |
| 2013/0253897 A1* | 9/2013 | Kanbe .................. G05B 11/01 703/13 |
| 2014/0038514 A1* | 2/2014 | Robbins ............. H04N 21/4122 455/3.06 |

OTHER PUBLICATIONS

Lloyd, Craig. "Real Racing 3 shows off Time Shifted Multiplayer." SlashGear. Feb. 3, 2013. Web. Feb. 11, 2014.

Nickinson, Phil et al. "How can mobile get its multiplayer game on?" Android Central. Web. Feb. 11, 2014.

* cited by examiner

LOCATION RELEVANT DATA COMMUNICATION

FIELD OF INVENTION

The present invention relates in general to communicating and processing information relevant to a specific location.

BACKGROUND OF INVENTION

As computing devices have become less bulky, computing operations that used to require fixed computing equipment may increasingly be performed by mobile devices. For example, mainframe computers are no longer necessary for many tasks that may be accomplished using laptop or tablet devices. Mobile workers may prepare documents and presentations when travelling in trains, for example. Also email and calendar functions may be accomplished on the move, often facilitated by wireless communication networks.

Scientific computing, such as Monte Carlo simulation, was previously conducted exclusively in mainframe computers. Modern laptops, however, may provide sufficient computing capability to perform at least limited simulations sufficient for a number of applications, such as modelling radio paths and integrated circuits, for example. Simulation results obtained in a laptop device may be employed in documents likewise created on a laptop device, which may even be the same laptop device.

Control of industrial processes is a field where computing is performed in fixed computers, which may be located in premises of an industrial facility. Industrial processes include, for example, power generation in coal-fired, gas-fired or nuclear power plants, different chemical processes and sequences of programmable manufacturing robots, for example such as ones to be found in a highly automated automobile manufacturing facility.

Some tasks or processes are most relevant in a specific location. For example, upon arriving in a train station of a city travelers may find themselves facing similar challenges, such as obtaining currency, finding a connection to a different mode of transport, purchasing a map or obtaining a taxi. To meet demand for services relevant to a specific location, services may be optimized for specific locations, for example a coffee shop may provide a wireless hotspot for low-cost, or free, communication capability and internet connectivity. Customers can then interface with the hotspot with their portable devices, such a laptops, tablets, phablets, smart-phones or cellular telephones, to obtain access to services they habitually use. Customers may also obtain access to services offered by the establishment, such as menus and other locally relevant information.

SUMMARY OF THE INVENTION

In accordance with a first aspect of the present invention, there is provided an apparatus comprising a memory configured to store information specific to a current location of the apparatus, the information comprising at least one indication of at least one prior processing performed on the information by a second apparatus distinct from the apparatus, at least one processing core configured to perform at least one processing action on the information, determine, whether the at least one processing action is superior to the at least one prior processing in accordance with a metric, and cause the information to be at least in part transmitted from the apparatus, wherein at least one of the occurrence of the transmission and the content of the transmission is at least in part dependent on a result of the determination.

In accordance with a second aspect of the present invention, there is provided a method comprising storing information specific to a current location of an apparatus, the information comprising at least one indication of at least one prior processing performed on the information by a second apparatus distinct from the apparatus, performing at least one processing action on the information, determining, whether the at least one processing action is superior to the at least one prior processing in accordance with a metric, and causing the information to be at least in part transmitted from the apparatus, wherein at least one of the occurrence of the transmission and the content of the transmission is at least in part dependent on a result of the determination.

In accordance with a third aspect of the present invention, there is provided an apparatus comprising means for storing information specific to a current location of an apparatus, the information comprising at least one indication of at least one prior processing performed on the information by a second apparatus distinct from the apparatus, means for performing at least one processing action on the information, means for determining, whether the at least one processing action is superior to the at least one prior processing in accordance with a metric, and means for causing the information to be at least in part transmitted from the apparatus, wherein at least one of the occurrence of the transmission and the content of the transmission is at least in part dependent on a result of the determination.

In accordance with a fourth aspect of the present invention, there is provided a non-transitory computer readable medium having stored thereon a set of computer readable instructions for causing a processor to display a list of items on an electronic device comprising the computer implemented steps of storing information specific to a current location of an apparatus, the information comprising at least one indication of at least one prior processing performed on the information by a second apparatus distinct from the apparatus, performing at least one processing action on the information, determining, whether the at least one processing action is superior to the at least one prior processing in accordance with a metric, and causing the information to be at least in part transmitted from the apparatus, wherein at least one of the occurrence of the transmission and the content of the transmission is at least in part dependent on a result of the determination In accordance with a fifth aspect of the present invention, there is provided an apparatus comprising a memory configured to store information specific to a current location of the apparatus, the information comprising at least one indication of at least one prior processing performed on the information by a second apparatus distinct from the apparatus, at least one processing core configured to perform at least one processing action on the information, and determine, whether the at least one processing action is superior to the at least one prior processing in accordance with a metric.

In accordance with a sixth aspect of the present invention, there is provided a method comprising storing information specific to a current location of an apparatus, the information comprising at least one indication of at least one prior processing performed on the information by a second apparatus distinct from the apparatus, performing at least one processing action on the information, and determining, whether the at least one processing action is superior to the at least one prior processing in accordance with a metric.

In accordance with a seventh aspect of the present invention, there is provided a method, comprising receiving at a server a request for information specific to a current location of a mobile apparatus, causing the requested information to be transmitted to the mobile apparatus, the transmitted information comprising at least one indication of at least one prior processing performed on the information by a second apparatus distinct from the mobile apparatus, and receiving from the mobile apparatus second information comprising an indication of at least one processing performed on the requested information by the mobile apparatus.

DETAILED DESCRIPTION OF EXAMPLE EMBODIMENTS

Figure 1:
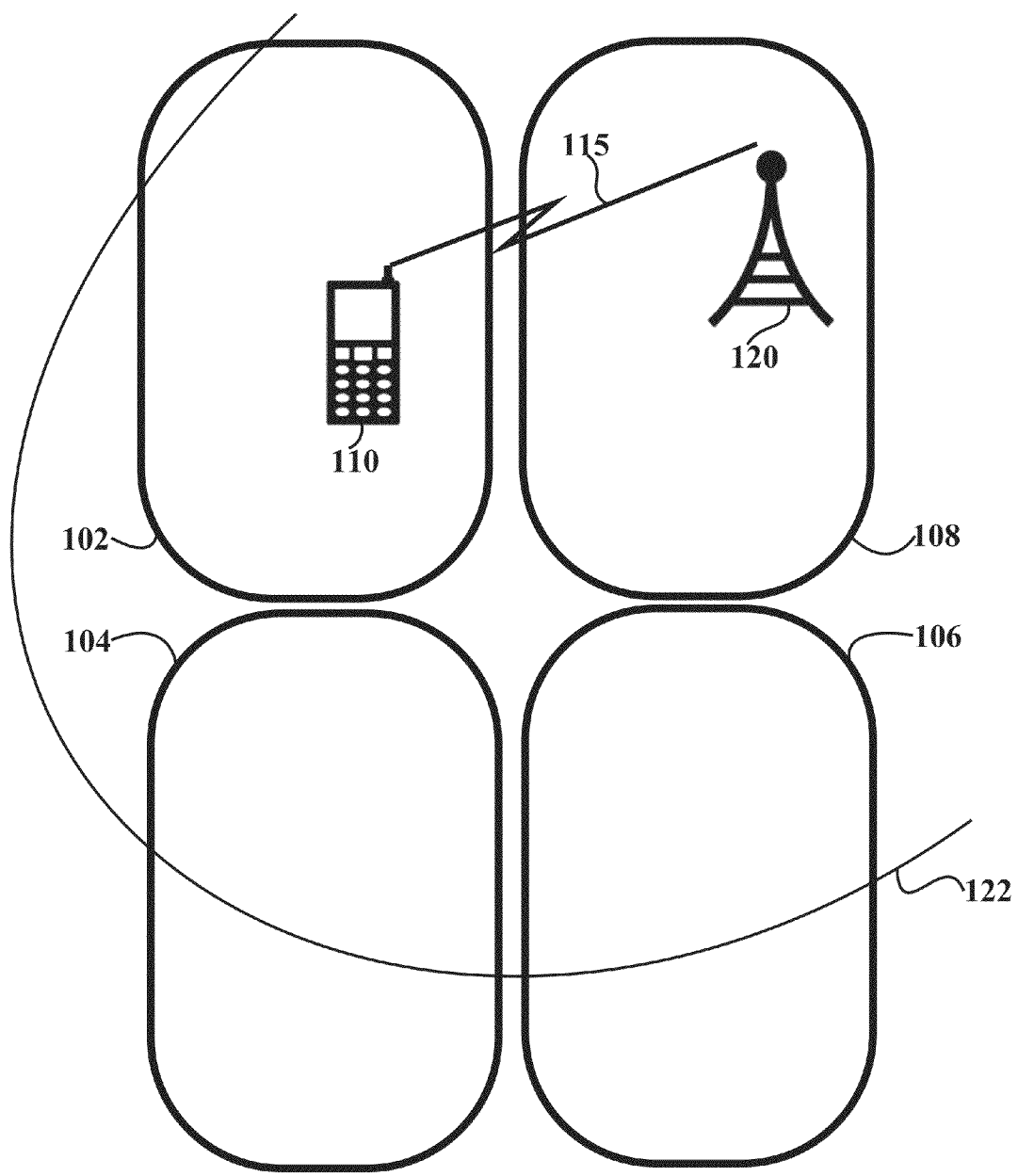
FIG. 1 illustrates a first example system capable of supporting at least some embodiments of the present invention.

FIG. 1 illustrates a first example system capable of supporting at least some embodiments of the present invention. Illustrated are locations 102, 104, 106 and 108. The locations may be defined in terms of coordinates, for example, wherein location 102, for example, would be defined by a pair of longitude and a pair of latitude parameters, as an area enclosed by said longitude and latitude parameters in accordance with a geo-location system. Locations 104, 106 and 108 may be similarly defined in a coordinate representation. A location may alternatively be defined in terms of a single coordinate point and a radius, in which case a point would be determined to fall inside the location in case it is at most the radius distant from the single coordinate point.

Alternatively to coordinates, locations 102, 104, 106 and 108 may be defined in terms of addresses, for example location 102 may be defined in terms of streets that enclose the location. As a yet further alternative, a location may be defined as a vicinity of a landmark, wherein everything at most a certain pre-defined distance from the landmark would be defined as falling within the location. A location may be defined as a communication range of a near-field communication, NFC, device or a communication range of a wireless hotspot. A location may be defined in terms of a moving transport such as a car, a ship or an aircraft. In case of a moving vehicle, the location may co-move with the vehicle and the location may be thought of as on-board the vehicle. A location defined as co-moving with a vehicle may in practice be defined by ability to communicate stably with a near-field communication device or wireless hotspot in the vehicle.

Where a location is defined in terms of capability to communicate with a NFC or another wireless device, an apparatus may use that wireless device or another network for data communication. For example, where a location is defined as co-moving with a ship and capability of communicating with the ship's onboard WiFi network, a device may rely on the onboard WiFi network for the purpose of establishing its presence in the defined location, but it may rely on a cellular or satellite communication system for communication of payload data with further apparatuses. This may be useful for charging or data security purposes, in case a user of the device prefers to not let the ship's WiFi network become aware of the data he communicates.

A location may be defined as a wire-line communication network. In this case, an apparatus is determined to be in the location in case it is plugged by a communication cable to the wire-line network. The wire-line network may comprise a single socket or a plurality of at least two communication sockets.

In addition to locations 102, 104, 106 and 108 FIG. 1 illustrates base station 120, which may comprise a cellular or non-cellular base station. A non-cellular base station may be referred to as an access point. Base station 120 may be arranged to operate in accordance with a cellular communication standard, such as for example wideband code division multiple access, WCDMA, or long term evolution, LTE. Base station 120 may be arranged to operate in accordance with a non-cellular communication standard, such as for example wireless local area network, WLAN, also known as WiFi, or worldwide interoperability for microwave access, WiMAX. Base station 120 may be configured to establish wireless links with mobile devices in accordance with any standard or standards base station 120 is arranged to operate in accordance with.

Mobile 110 may comprise a cellular telephone, smartphone, tablet device, phablet device, laptop computer or other electronic device with wired or wireless communication capability. In the illustrated example, mobile 110 has wireless link 115 with base station 120. Wireless link 115 may operate in accordance with a wireless standard that both mobile 110 and base station 120 are configured to support. Wireless link 115 may comprise an uplink for conveying information from mobile 110 to base station 120. Wireless link 115 may comprise a downlink for conveying information from base station 120 to mobile 110. Wireless link 115 may be arranged to operate in accordance with time division multiple access TDMA, or code division multiple access, CDMA, principles, for example.

Mobile 110 may be configured to seek attachment to a cell controlled by base station 120 when disposed inside such a cell. FIG. 1 illustrates a boundary of a cell coverage area of a cell controlled by base station 120 by contour 122. As mobile 110 is disposed inside contour 122, it is within a cell coverage area of a cell controlled by base station 120 and capable of attaching to such a cell.

Responsive to approaching contour 122, mobile 110 may be configured to measure for transmissions from other base stations in anticipation of a possible handover to a cell controlled by such other base station in case mobile 110 leaves the cell coverage area defined by contour 122. Such other base stations may be comprised in the same network as base station 120, or in other networks. Such other base stations may operate in accordance with a same wireless standard as base station 120, or they may operate in accordance with a different standard. A handover to a cell controlled by a base station operating in accordance with a different standard may be referred to as an inter-radio access technology, or inter-RAT, handover.

A location, such as location 102, may have defined therein location specific information. Mobile 110 may inquire from a network entity whether it is in a location with location specific information, or the network entity may push to mobile 110 an indication that it is in a location with location specific information defined. The network entity may be comprised in a network backend or in a base station, for example.

Information specific to a location may comprise information describing the operation of an industrial process substantially at the location. For example, a user may enter premises of a factory and receive in his device an update concerning the status of the process, wherein the status may comprise information on temperature, pressure, chemical concentrations and/or similar properties. The information may comprise indications of at least one previous adjustment or interaction made to the information at the location.

The user may interact with the information describing the status of the process by adjusting parameters, authorizing use of aspects of the process not in use or shutting down aspects of the process in use. Mobile 110 may be configured to use a pre-defined metric to judge whether the interaction is beneficial or not, for example whether the interaction would improve functioning of the industrial process in light of previous adjustments or interactions already made.

The metric may comprise simulating the effects of the interaction on the industrial process, wherein the simulating may take place on mobile 110 or remotely from mobile 110, for example in a data cloud or backend. Mobile 110 may communicate with such a cloud or backend via wireless link 115 and base station 120, for example. In case the simulation indicates the industrial process as amended according to the interaction would improve yield or quality, reduce emissions, reduce sound and/or reduce vibrations in the process, the interaction may be considered as superior to previous adjustments or interactions. An interaction considered superior may be taken into use, in other words the functioning of the industrial process may be amended in accordance with changes comprised in the interaction.

In case more than one user is present in the location and attempts to amend the industrial process, amendments entered by the users may be ranked based on the simulation metric, and the highest-ranking amendment, which is foreseen to improve the industrial process most, may be adopted. In this sense, a plurality of users may competitively try to improve the functioning of the process. A record may be kept of attempts to improve the process, with scores associated with at least some of the attempts, the scores being derived using the metric. Such a record may be seen as a local high-score list. Such a local high-score list may be used in blocking certain poorly performing apparatuses from submitting proposed amendments to the industrial process, for example.

Information specific to a location may comprise a locally available executable element. A locally available executable element may comprise, for example, a program configured to control, at least in part, the industrial process. Such a program may be pre-installed or installed to a mobile 110 responsive to the mobile 110 entering a location associated with the locally available executable element, such as for example grounds of a factory. Such a program may be deleted from a mobile 110 responsive to the mobile 110 leaving the location associated with the locally available executable element. Deleting the program may improve data security of the industrial process since its control logic would remain secret in case the mobile 110 is lost or stolen.

Information specific to a location may comprise information describing a game that may be played on a mobile 110 at the location. Information describing a game may comprise, for example, an executable game file or files operable to play the game on a device, at least one game data file describing at least one prior try at playing the game or a local high-score list of the game. For example, a local high-score list, that is a high-score list specific to the location, may be obtained in mobile 110 and a user of mobile 110 may play the game while at the location to attempt entry on the local high-score list. The local high-score list may exclusively comprise entries of attempts at playing the game at the location, and not at other locations or outside the location.

A game program may be pre-installed on mobile 110 prior to entry of mobile 110 in the location, such as for example location 102. When in the location a user of mobile 110 may be informed of the existence of a local high-score list and an opportunity to attempt entry on the local high-score list. Alternatively a user of mobile 110 may query for existence of a local high-score list when at a site relevant to a specific game. For example, when visiting a Formula 1 racing circuit a user may query whether there is a local high-score list defined for that location for a racing game. Alternatively to being installed on mobile 110, the game program may be at least in part situated in a back-end, server or cloud and run at least in part there. The game program may be run essentially completely at the back-end or server, with mobile 110 providing only display and user interface functions to allow playing the game via mobile 110.

A game program may be installed on mobile 110 responsive to entry of mobile 110 to location 102, for example. A user may be prompted with information of local availability of a game program, and responsive to the user consenting to installation the game program may be installed, for example over the air. In such a case, the game program may be available in at least one location but not globally. In such a case, the locally available game program may comprise a localized version of a globally available game program. Global availability may comprise availability that is not restricted in terms of location. A locally available game program may have or be associated with a local high-score list that stores records of the most successful tries in playing the locally available game. The locally available game may only be playable in the location associated with the locally available game, that is to say it may not be available for playing globally. Where a locally available game is installed responsive to entry of mobile 110 to the associated location, such as location 102, the locally available game may be deleted from mobile 110 responsive to mobile 110 leaving the location.

A locally available game is an example of a locally available executable element. An executable element may comprise a digital file that may be executed by a processor, that is a file that is configured to direct a programmable computer to perform a sequence of actions such as provide a user interface, allow adjustment of industrial parameters or play a game. In some operating systems, an executable element is known as a ".EXE" file. Alternatively or in addition to a locally available game there may be provided a locally available game session. In this case, the game as such may be more widely available, but a specific session, such as for example a multi-player or single-player session, is locally restricted in availability. In general a locally available executable element may only be executable in a location associated with the locally available executable element. The locally available executable element may be configured to verify, using a location function of mobile 110, that mobile 110 is disposed in the location associated with the locally available executable element and abort execution in case mobile 110 is not disposed in the location associated with the locally available executable element. A locally available executable element may be configured to delete itself from a computing device responsive to the computing device, such as for example mobile 110, leaving the location associated with the locally available executable element.

Figure 2:
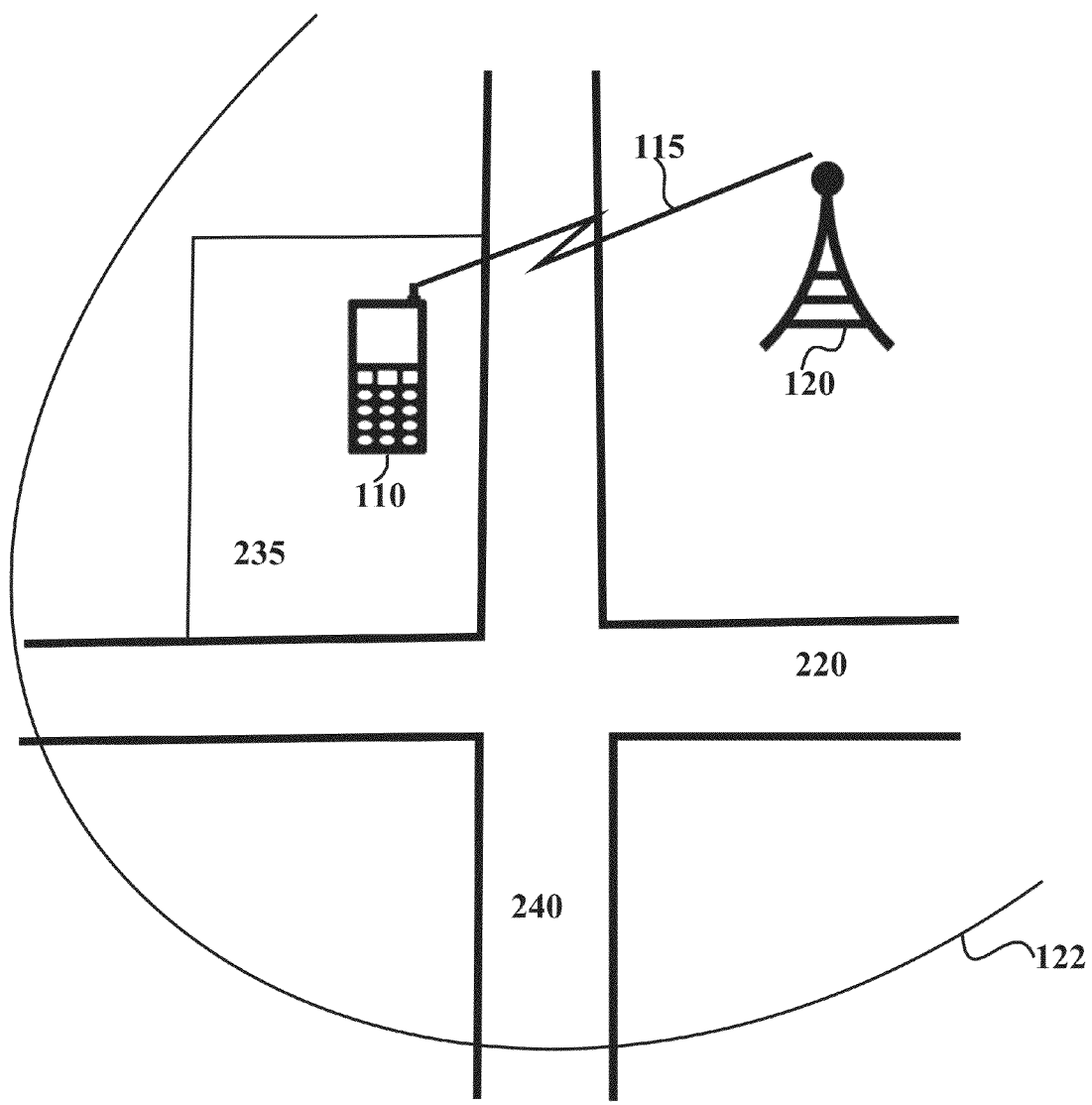
FIG. 2 illustrates a second example system capable of supporting at least some embodiments of the present invention.

FIG. 2 illustrates a second example system capable of supporting at least some embodiments of the present invention. Like reference signs denote similar structures as in FIG.

1, in particular mobile 110, base station 120 and wireless link 115 are substantially similar to those of FIG. 1.

In the embodiment of FIG. 2, a location is defined as at least one street address 235. In the illustrated example, at least one street address 235 is disposed in a corner of streets 220 and 240. In general a location comprising at least one street address may comprise a single street address or a concatenation of adjacent or non-adjacent street addresses. Mobile 110 may use a mapping feature comprised in mobile 110 to determine an estimate of its current street address to determine whether it is disposed in the location. To allow for errors in mapping, a variance of configurable magnitude may be allowed when determining whether mobile 110 is in the location, for example if mobile 110 determines the street address is slightly different from one defined as being comprised in the location, mobile 110 may consider itself as disposed inside the location.

In some embodiments, a user may be given a token, such as for example a wrist band, comprising a short-range network adapter, such as for example a NFC chip, Bluetooth or WLAN. The user may interact with a short-range element in an amusement park, wherein the short-range element may provide the definition of a location. If an amusement park comprises a plurality of short-range elements disposed in different parts of the park, each short-range element may define its own location, or alternatively the short-range elements may define the amusement park as their common location. In the latter case, the user is considered to be in the amusement park location when interacting with any of the short-range elements comprised in the amusement park. For example, the user may attempt entry on a high-score list of the amusement park for a game. The amusement park may hand out a prize for the highest score played during a predefined time interval on the grounds of the park. A game may be configured to obtain information via the NFC chip, such that the NFC chip receives the information wirelessly or via contact, and then provides at least part of the received information to the game.

For example, where the information specific to the location comprises a local high-score list, when playing a game, a user of mobile-A may select a specific entry on a local high-score list in the information to challenge when playing, the local high-score list being comprised in the information.

Figure 3:
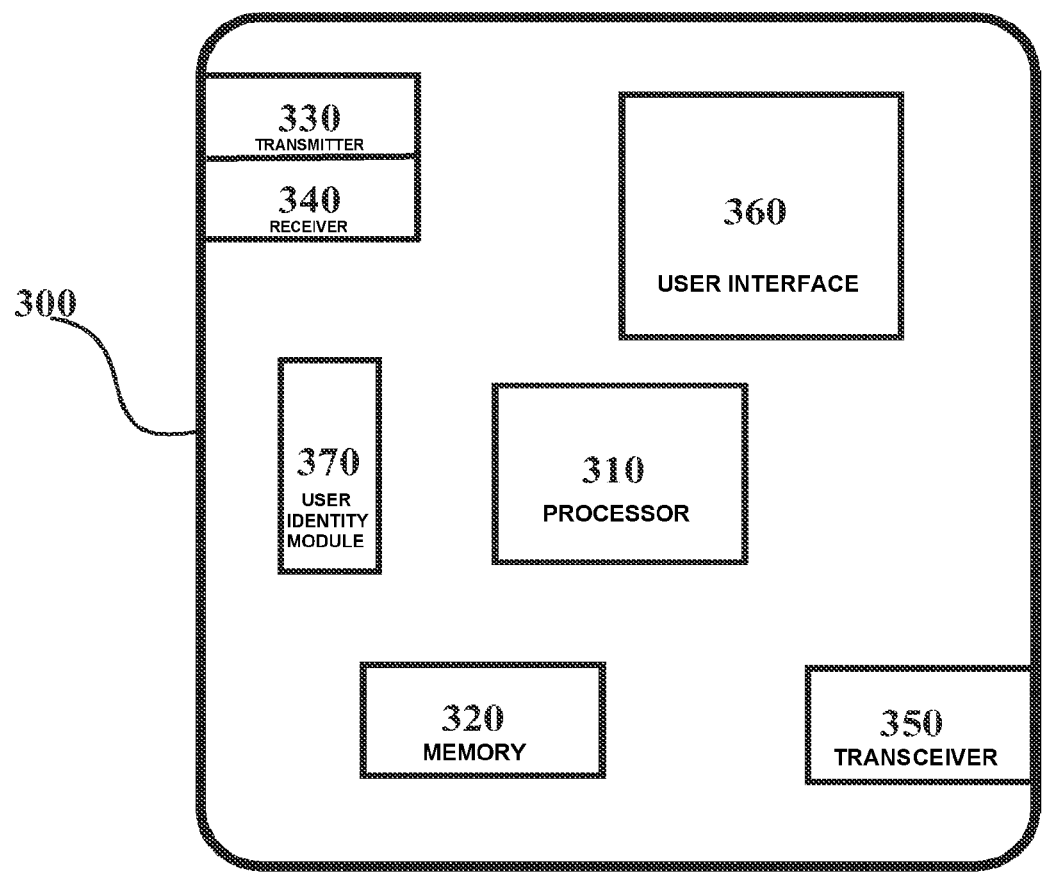
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as mobile 110 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices corporation. Processor 310 may comprise at least one application-specific integrated circuit, ASIC. Processor 310 may comprise at least one field-programmable gate array, FPGA.

Device 300 may comprise memory 320. Memory 320 may comprise random-access memory and/or permanent memory. Memory 320 may comprise at least one RAM chip. Memory 320 may comprise magnetic, optical and/or holographic memory. Memory 320 may be at least in part accessible to processor 310. Memory 320 may comprise computer instructions that processor 310 is configured to execute.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
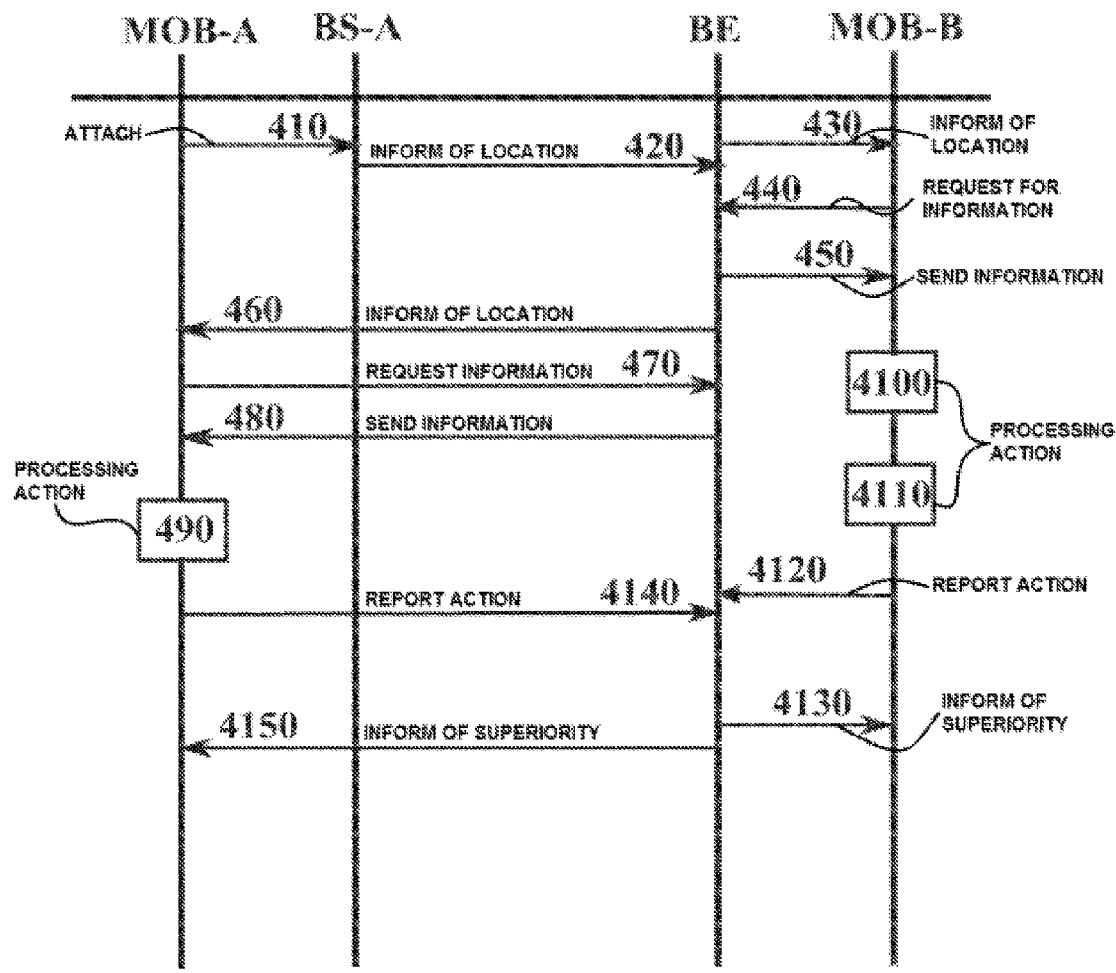
FIG. 4 is a signalling diagram illustrating signalling in accordance with at least some embodiments of the present invention.

FIG. 4 is a signalling diagram illustrating signalling in accordance with at least some embodiments of the present invention. On the vertical axes are, from left to right, MOB-A or mobile-A, which may correspond, for example, to mobile 110 of FIG. 1 or FIG. 2. BS-A may correspond to base station 120, for example. BE signifies a back-end, for example a server or cloud service. The back-end may be located at a specific location or generally in a network. The backend may be located in a core network of a cellular network where also BS-A is comprised. In some embodiments, the backend is a feature of BS-A. In those cases, messaging between BS-A and the backend is internal messaging of BS-A. MOB-B, or mobile-B, may comprise a mobile similar to mobile 110. Mobile-B may communicate with the backend via a base station that is not illustrated in FIG. 4 for sake of clarity.

In phase 410 mobile-A may attach to BS-A to obtain connectivity to at least one communication network. Messaging illustrated as arrow 410 may comprise an estimate of a present location of mobile-A, or BS-A may be configured to derive a location estimate of mobile-A. BS-A may derive a location estimate of mobile-A by triangulating with other base stations, or BS-A may use its cell coverage area as a present location of mobile-A. Where the messaging of phase 410 comprises a location estimate for mobile-A, mobile-A may have derived the location estimate using satellite positioning circuitry comprised in mobile-A, for example.

In phase 420, BS-A may inform the backend of a location estimate of mobile-A. BS-A may have received the location estimate in phase 410 or BS-A may have derived the location estimate itself. BS-A may be triggered to inform the backend by determining that the location estimate falls within a predefined location stored in a memory internal to BS-A. Alternatively, BS-A may be configured to inform the backend concerning locations of all mobiles attached to itself, or concerning the locations of all mobiles of a certain subscription type attached to itself. In some embodiments, base stations may be provided with information concerning pre-defined locations that fall at least in part within a cell coverage area of a cell controlled by the base station, wherein the base stations are thereafter configured to inform a backend when the base stations determine that a mobile is disposed in a pre-defined location.

In phase 430, the backend may inform mobile-B that mobile-B is disposed in a location with associated information specific to the location. The information may comprise a program for controlling an industrial process, a parameter set for controlling the industrial process, a game or a local high-score list for the game, for example.

In phase 440, responsive to phase 430 mobile-B may request for the information specific to the location to be transmitted to itself. Alternatively, the backend may be configured to push the information to mobile-B already in phase 430 in which case phase 440 may be absent.

In phase 450, mobile-B receives the information specific to the location from the backend, in case this information was not received already in phase 430.

In phase 460, the backend may inform mobile-A that mobile-A is disposed in a location with associated information specific to the location. The message of phase 460 may also inform mobile-A that mobile-B is in the same location. Phase 460 may also comprise that information specific to the location is pushed to mobile-A.

In case the information specific to the location was not pushed to mobile-A in phase 460, mobile-A may request for the information in phase 470 and receive the requested information in phase 480.

In phase 490, mobile-A may perform at least one processing action on the information. The at least one processing action may comprise, for example, modifying a parameter of the industrial process or playing the game. Playing a game may comprise playing an entire game or game session, or in general performing at least one interaction with a game. In phases 4100 and 4110, mobile-B may likewise perform at least one processing action on the information. The processing actions of mobile-B may be of similar type to those performed on the information by mobile-A.

In phase 4120 mobile-B may report to the backend concerning the processing actions of phases 4100 and 4110. Alternatively, mobile-B may report separately for the at least one processing action of phase 4100 and the at least one processing action of phase 4110. For example, mobile-B may include in the report a measure of superiority of the processing of at least one of phases 4100 and 4110, with respect to at least one previous processing. Such at least one previous processing may be described in the information obtained in phase 430 or 450, for example. Alternatively, mobile-B may report to the backend characteristics of the processings of phases 4100 and 4110 to enable the backend to determine the superiority, using a metric available to the backend. Such characteristics may comprise, for example, at least one score obtained when playing a game or a set of amended operating parameters of the industrial process.

In phase 4140 mobile-A may report to the backend concerning the at least one processing action of phase 490. For example, mobile-A may include in the report a measure of superiority of the processing of phase 490, with respect to at least one previous processing. Such at least one previous processing may be described in the information obtained in phase 460 or 480, for example. Alternatively, mobile-A may report to the backend characteristics of the at least one processing of phase 490 to enable the backend to determine the superiority, using a metric available to the backend. Such characteristics may comprise, for example, at least one score obtained when playing a game or a set of amended operating parameters of the industrial process.

In phase 4130 the backend may inform mobile-B of a superiority of the processing of phase 4100 and/or 4110 with respect to each other, the at least one prior processing and/or processing 490 performed by mobile-A. For example, the message of phase 4130 may comprise a list of processings and an associated superiority or preferability score calculated according to the metric. The message of phase 4130 may comprise an updated high-score list or leaderboard.

In phase 4150 the backend may inform mobile-A of a superiority of the processing of phase 490 with respect to the at least one prior processing and/or processing 4100 and/or 4110 performed by mobile-B. For example, the message of phase 4150 may comprise a list of processings and an associated superiority or preferability score calculated according to the metric. The message of phase 4150 may comprise an updated high-score list or leaderboard.

Following receipt of message 4150 in mobile-A and message 4130 in mobile-B, at least one of the mobiles may re-perform at least one processing action on the information specific to the location. In effect, mobile-A and mobile-B may enter into competition as to which one can produce a superior processing, as measured by the metric. In this sense, users of mobile-A and mobile-B may effectively compete as to which unit can provide a superior configuration for the industrial process, so that the most optimal configuration can be adopted in the physical process by the backend. Alternatively, mobile-A and mobile-B may compete in playing a locally relevant game for a highest rank in a high-score list specific to the location. In this sense, a user of a mobile may leave her high-score to a location she has visited for other mobile gamers to try to challenge later on.

The messages of phases 460, 470, 480, 4140 and 4150 may be exchanged between the backend and mobile-A via BS-A.

Figure 5:
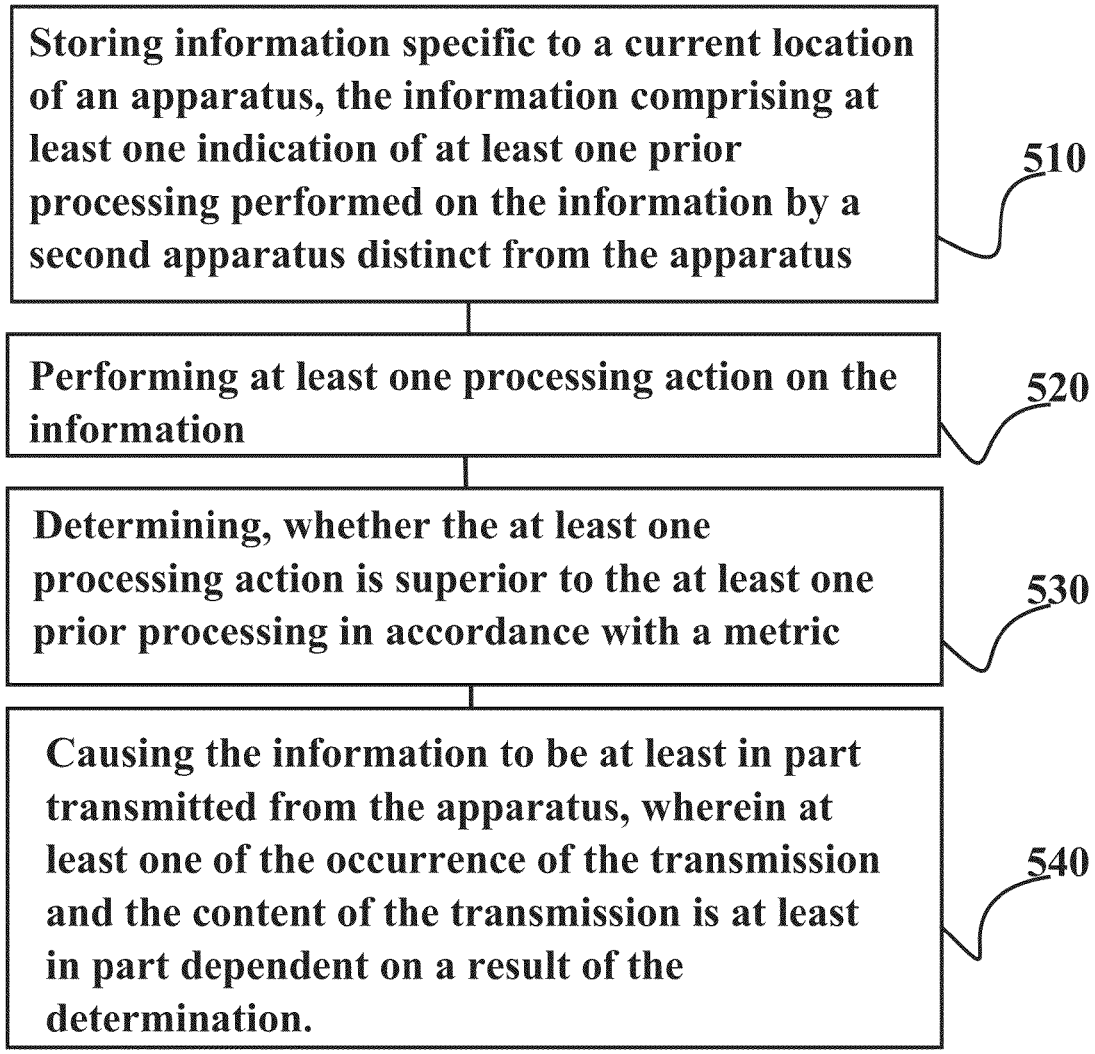
FIG. 5 is a flowchart illustrating a method in accordance with at least some embodiments of the present invention.

FIG. 5 is a flowchart illustrating a method in accordance with at least some embodiments of the present invention. The phases of the illustrated method may be performed in a mobile 110 of FIG. 1 or FIG. 2, for example.

Phase 510 comprises storing information specific to a current location of an apparatus, the information comprising at least one indication of at least one prior processing performed on the information by a second apparatus distinct from the apparatus.

Phase 520 comprises performing at least one processing action on the information. Phase 530 comprises determining, whether the at least one processing action is superior to the at least one prior processing in accordance with a metric.

Finally, phase 540 comprises causing the information to be at least in part transmitted from the apparatus, wherein at least one of the occurrence of the transmission and the content of the transmission is at least in part dependent on a result of the determination.

In general there is provided an apparatus, such as for example mobile 110. The apparatus may comprise a memory configured to store information specific to a current location of the apparatus, the information comprising at least one indication of at least one prior processing performed on the information by a second apparatus distinct from the apparatus. The prior processing may comprise adjustment of at least one parameter comprised in the information. The prior processing may comprise entering an entry on a high-score list comprised in the information. The second apparatus may be a mobile apparatus, for example. The information specific to the current location may comprise content specific to the current location. The information specific to the current location may comprise a locally available executable element. A locally available executable element may comprise a computer-executable program comprising computer-executable instructions in executable form.

The apparatus may further comprise at least one processing core configured to perform at least one processing action on the information. The at least one processing action may comprise, for example, adjustment of a parameter in an industrial process or playing a game. The at least one processing core may be configured to determine, using a metric and the at least one indication, whether the at least one processing is superior to the at least one prior processing. The indication may comprise the at least one indication of at least one prior processing performed on the information. The at least one processing core may be configured to determine whether the at least one processing is superior to the at least one prior processing by transmitting to a network entity information concerning the at least one processing and, optionally, information concerning the indication, and responsively receiving a measure of superiority from the network entity. Alternatively, the at least one processing core may determine whether the at least one processing is superior at least in part by applying locally in the apparatus the metric to information relating to the at least one processing.

The at least one processing core may be configured to cause the information to be at least in part transmitted from the apparatus, wherein at least one of the occurrence of the transmission and the content of the transmission may be at least in part dependent on a result of the determination. Transmitting at least in part may comprise transmitting, for example, a score obtained in playing a game. The transmitting of a score may be conditional to the score being high enough to merit inclusion in a local high-score list comprised in the information. The transmitting may comprise transmitting, directly or indirectly, to at least one of a base station and a backend.

The occurrence of the transmission being at least in part dependent on the result of the determination may comprise that the transmission is suppressed, in other words does not occur, in case the at least one processing is determined to be inferior to a threshold. The content of the transmission being at least in part dependent on the result of the determination may comprise that the information is modified prior to the transmission to include information on the result of the determination. For example, the information may be modified by including a new entry on a local high-score list comprised in the information.

The at least one processing core may be configured to refuse a request to perform the at least one processing action when the apparatus is no longer in the current location. In other words, in case the apparatus leaves the location the apparatus may be configured to refuse to allow a user to perform the action, for example adjust an industrial parameter or play a game. This way, the industrial process may only be adjusted from within the facility itself. This improves safety since malicious hackers would have a harder time entering adjustment instructions to the industrial process.

The at least one processing core may be configured to cause a request for the information specific to the current location to the transmitted to the apparatus. Such a request may comprise at least one indication concerning a technical capability of the apparatus. Such a technical capability may comprise, for example, a screen size, processor speed and memory capability. For example, a higher memory capability may enable an apparatus to receive a more detailed representation of a current state of an industrial process, or a more realistic rendering in a game.

In one embodiment of the present invention there is defined in a first location a locally available game, such as for example a car racing game available only at the first location and not globally. Upon entering the first location, a user may receive a notification of the availability of the locally defined game. The notification, which may comprise one or more messages, may comprise a local high-score list recording the most successful tries at playing the locally available game.

The user may choose the play the game, wherein the user may choose to play the game against one of the entries in the local high-score list. In case the user chooses to play the game against one of the entries in the local high-score list, the user may indicate this, using a user interface function, to the locally available game responsive to which the user's device may be provided with a game data file describing the play corresponding to the entry the user wants to play against. A player may perform the indication by interacting with a user interface element or function in a touch interface, or otherwise via a graphical user interface. Subsequently, when playing, the user may see on his screen a representation of the player who played the entry on the local high-score list the user plays against. Alternatively or additionally to a representation of the player, the user may see on his screen information on the game session or event played by the player who played the entry on the local high-score list the user plays against. For example, in a car game the user may see a representation of the car of the player who played the entry on the list. The course of the play of that player may be available in the game data file. Alternatively or additionally, the user interface may not comprise a visual element in which case the user may communicate through a voice user interface, push-button interface, vibrating interface or a touch-based user interface or a combination of at least two of these.

Alternatively or additionally, the notification may comprise an indication of players currently in the first location, allowing the user to challenge one or more of the players currently in the first location to play against.

The information specific to the current location may comprise at least one of: a set of at least one operating parameter, a description of a terrain, a set of at least one encryption key and a data file for a mobile game application. A description of a terrain may be relevant to an industrial process or a game. A description of a terrain may be represented in vector graphic or bitmap format, or a combination of a vector graphic and bitmap format. An encryption key may enable access to encrypted information, wherein the apparatus may permanently store at least part of the encrypted information. Allowing access to the encrypted information only when the apparatus is in the current location may improve data security and remove the need to communicate sensitive information over a wireless interface.

The information stored in the memory may comprise information on at least one further apparatus currently disposed in the current location. Causing the information to be at least in part transmitted from the apparatus may comprise causing transmission, as part of the information, of a challenge to at least one of the at least one further apparatus disposed in the current location to competitively perform further processings on the information in the current location.

In case a user of the apparatus prefers to not receive challenges, the apparatus may be configured to allow the user cause a silent flag to be included in a message transmitted from the apparatus to a backend, the backend responsively not informing further apparatuses of the presence of the apparatus in the current location. An advantage of this is that a supervisor may be present at the industrial process site unknown to individual users and the supervisor may observe the actions of users in adjusting parameters of the process.

In general a metric in terms of a game may comprise measuring a score, such as for example a high-score list. Alternatively or additionally, it may comprise measuring a time, for example how long it takes to complete a task in a game. A game session may comprise, for example, all actions taken in a game from starting a game session to closure of the game session.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
    at least one memory comprising computer program code;
    at least one processor;
    wherein the at least one memory and the computer program code are configured, with the at least one processor, to cause the apparatus at least to:
    store information specific to a current location of a first user equipment, the information comprising at least one first indication of at least one prior processing performed on the information by a second user equipment distinct from the first user equipment;
    receive at least one second indication comprising at least one processing action performed on the information;
    determine, whether the at least one processing action is superior to the at least one prior processing in accordance with a metric; and
    transmit at least a part of the information to at least the first user equipment or the second user equipment, wherein content of at least part of the information dependent on a result of the determination.

2. An apparatus according to claim 1, wherein the at least one processing core is further configured to refuse a request to perform the at least one processing action when the first user equipment is no longer in the current location.

3. An apparatus according to claim 1, wherein the at least one processing core is further configured to cause a request for the information to be transmitted, the request requesting for the information to be transmitted from the first user equipment.

4. An apparatus according to claim 1, wherein the at least one processing action comprises modifying at least one parameter comprised in the information, the parameter at least in part controlling an industrial process occurring at the current location.

5. An apparatus according to claim 1, wherein the at least one processing action comprises playing a game.

6. An apparatus according to claim 1, wherein the at least one processing core is further configured to modify the information at least in part in dependence of the result of the determination before causing the transmitting.

7. An apparatus according to claim 1, wherein the occurrence of the transmitting being at least in part dependent on the result of the determination comprises that responsive to the at least one processing action being determined to not be superior to the at least one prior processing, the transmitting does not occur.

8. An apparatus according to claim 1, wherein the content of the transmission being at least in part dependent on the result of the determination comprises that the at least one processing core is further configured to modify the information in dependence of the result of the determination before the transmitting.

9. An apparatus according to claim 8, wherein the at least one processing core is configured to modify the information by including in the information an indication of a relative superiority of the at least one processing action.

10. An apparatus according to claim 9, wherein the indication of the relative superiority is expressed in terms of the metric.

11. An apparatus according claim 1, wherein the apparatus comprises a mobile computing or communication device further comprising at least one antenna arranged to provide information to a radio receiver comprised in the apparatus.

12. An apparatus according to claim 1, wherein determining whether the at least one processing action is superior to the at least one prior processing in accordance with the metric comprises either applying the metric to the at least one processing action in the apparatus or providing at least one characteristic of the at least one processing action to an entity and receiving from the entity an indication of relative superiority.

13. A method comprising:
   storing information specific to a current location of a first user equipment, the information comprising at least one first indication of at least one prior processing performed on the information by a second user equipment distinct from the first user equipment;
   receiving at least one second indication comprising at least one processing action performed on the information;
   determining, whether the at least one processing action is superior to the at least one prior processing in accordance with a metric; and
   transmitting at least a part of the information to at least the first user equipment or the second user equipment, wherein content of at least part of the information dependent on a result of the determination.

14. A method according to claim 13, further comprising causing a request for the information to be transmitted, the request requesting for the information to be transmitted from the first user equipment.

15. A method according to claim 14, wherein the request comprises at least one indication of a technical capability of the first user equipment.

16. A method according to claim 13, wherein the information comprises at least one of: a set of at least one operating parameter, a description of a terrain, a set of at least one encryption key and a data file for a mobile game application.

17. A method according to claim 13, wherein the at least one processing action comprises modifying at least one parameter comprised in the information, the parameter at least in part controlling an industrial process occurring at the current location.

18. A method according to claim 13, wherein the at least one processing action comprises playing a game.

19. A method according to claim 13, further comprising modifying the information least in part in dependence of the result of the determination before causing the transmitting.

20. A method according to claim 13, wherein the occurrence of the transmitting being at least in part dependent on the result of the determination comprises that responsive to the at least one processing action being determined to not he superior to the at least one prior processing, the transmitting does not occur.

21. A method according to claim 13, wherein the content of the transmission being at least in part dependent on the result of the determination comprises that the information is modified in dependence of the result of the determination before the transmitting.

22. A method according to claim 13, wherein the current location comprises at least one of an address, a vicinity of a landmark, a geo-location defined in terms of coordinates, a communication range of a near-field communication device, a communication range of a wireless hotspot a communication range of a short-range communications element, a car, a ship and an aircraft.

23. A method according to claim 13, wherein determining whether the at least one processing is superior to the at least one prior processing in accordance with the metric comprises either applying the metric to the at least one processing in the apparatus or providing at least on characteristic of the at least one processing to an entity and receiving from the entity an indication of relative superiority.

24. A non-transitory computer-readable medium encoding instructions that, when executed in hardware, perform a process, the process comprising:
   storing information specific to a current location of a first user equipment, the information comprising at least one first indication of at least one prior processing performed on the information by a second user equipment distinct from the first user equipment;
   receiving at least one second indication comprising at least one processing action performed on the information;
   determining, whether the at least one processing action is superior to the at least one prior processing in accordance with a metric, and
   transmitting at least a part of the information to at least the first user equipment or the second user equipment, wherein content of at least part of the information dependent on a result of the determination.

* * * * *